(12) United States Patent
Yokoi et al.

(10) Patent No.: US 9,273,683 B2
(45) Date of Patent: Mar. 1, 2016

(54) MOTOR-DRIVEN COMPRESSOR

(75) Inventors: Kenji Yokoi, Kariya (JP); Ken Suitou, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 728 days.

(21) Appl. No.: 13/432,679

(22) Filed: Mar. 28, 2012

(65) Prior Publication Data
US 2012/0251357 A1 Oct. 4, 2012

(30) Foreign Application Priority Data

Mar. 28, 2011 (JP) .................................. 2011-070324

(51) Int. Cl.
| | |
|---|---|
| *F04B 35/04* | (2006.01) |
| *F04B 39/12* | (2006.01) |
| *F04B 53/16* | (2006.01) |
| *B60H 1/00* | (2006.01) |
| *B60H 1/32* | (2006.01) |

(52) U.S. Cl.
CPC ............ *F04B 39/12* (2013.01); *B60H 1/00514* (2013.01); *B60H 1/3229* (2013.01); *F04B 39/121* (2013.01); *F04B 39/127* (2013.01); *F04B 53/16* (2013.01); *B60H 2001/006* (2013.01)

(58) Field of Classification Search
CPC .......... F04B 39/12; F04B 53/16; F04B 53/22; F04B 17/03; F04B 35/04; F04B 39/121; F04B 39/127; F16L 3/1016; F16L 3/1091; F16L 3/222; F16L 3/1075; F16L 55/035

USPC ........ 417/360, 361, 363, 413.5; 248/65, 74.1, 248/74.3
See application file for complete search history.

(56) References Cited

U.S. PATENT DOCUMENTS

| | | | | |
|---|---|---|---|---|
| 4,938,448 | A | * | 7/1990 | Shimazaki .................... 248/635 |
| 6,131,859 | A | * | 10/2000 | Giuliano ......................... 248/62 |
| 6,669,452 | B2 | * | 12/2003 | Ogawa et al. ................. 417/360 |

(Continued)

FOREIGN PATENT DOCUMENTS

| | | |
|---|---|---|
| EP | 0 904 962 A2 | 3/1999 |
| JP | 55-45084 | 9/1978 |

(Continued)

OTHER PUBLICATIONS

Korean Office Action dated May 3, 2013 issued in Korean Patent Application No. KR 10-2012-0029770.

(Continued)

*Primary Examiner* — Justin Jonaitis
*Assistant Examiner* — Stephen Mick
(74) *Attorney, Agent, or Firm* — Sughrue Mion, PLLC

(57) ABSTRACT

A motor-driven compressor to be mounted to an attachment section of a vehicle includes a fluid compression unit, an electric drive unit for the compression unit and a case. The case has a main body formed from a resin and covering at least the compression unit, and a mounting portion that is provided integrally with the main body and configured to be mounted to the attachment section. The mounting portion has a tubular body provided integrally with the main body and a fastening member inserted into the tubular body for mounting the tubular body to the attachment section. The main body is interposed between the compression unit and the tubular body.

5 Claims, 5 Drawing Sheets

(56) References Cited

U.S. PATENT DOCUMENTS

| | | | |
|---|---|---|---|
| 7,207,187 B2* | 4/2007 | Funahashi et al. | 62/228.4 |
| 9,038,968 B2* | 5/2015 | Hennon | 248/73 |
| 2001/0032764 A1* | 10/2001 | Hasegawa et al. | 188/378 |
| 2002/0131878 A1 | 9/2002 | Ogawa et al. | |
| 2003/0156951 A1 | 8/2003 | Kamiya et al. | |
| 2006/0056936 A1* | 3/2006 | Ishimaru et al. | 411/81 |
| 2007/0131823 A1* | 6/2007 | Mominee et al. | 248/62 |
| 2008/0314072 A1* | 12/2008 | Plank et al. | 62/498 |
| 2010/0018244 A1* | 1/2010 | Watanabe et al. | 62/508 |
| 2011/0243767 A1 | 10/2011 | Tozawa et al. | |

FOREIGN PATENT DOCUMENTS

| | | | |
|---|---|---|---|
| JP | 63-65873 | U | 4/1988 |
| JP | 64-44810 | U | 3/1989 |
| JP | 64-44812 | U | 3/1989 |
| JP | 64-44815 | U | 3/1989 |
| JP | 2000-130330 | A | 5/2000 |
| JP | 2001-066043 | A | 3/2001 |
| JP | 2005-220854 | A | 8/2005 |
| JP | 2005-220855 | A | 8/2005 |
| JP | 2005-220856 | A | 8/2005 |
| JP | 3804589 | B2 | 5/2006 |
| JP | 2008-088958 | A | 4/2008 |
| JP | 2009-074386 | A | 4/2009 |
| JP | 2010-138808 | A | 6/2010 |
| JP | 2011-058383 | A | 3/2011 |

OTHER PUBLICATIONS

Japanese Office Action, "Preliminary Notice of Reasons for Rejection," mailed on Dec. 17, 2013 in KR Patent Application 2011-070324 (An English translation is provided corresponding to cite No. 5, of the IDS submitted on Mar. 11, 2014).

Korean Office Action dated May 3, 2013, "Notice of Request for Submitting Argument," issued in Korean Patent Application No. 2012-0029770 (An English Translation is provided corresponding to cite No. 3 of the IDS submitted on Jun. 13, 2013).

Extended European Search Report for corresponding EP Patent Application No. 12161255.0 dated Aug. 2, 2012.

Japanese Office Action for corresponding JP Patent Application No. 2011-070324 issued on Dec. 17, 2013.

* cited by examiner

MOTOR-DRIVEN COMPRESSOR

BACKGROUND OF THE INVENTION

1. Field of the Invention

The invention relates to a motor-driven compressor, and more particularly to a motor-driven compressor to be installed on a vehicle.

2. Description of the Related Art

In a hybrid vehicle that travels by using an engine and an electric motor, the ratio of engine operation mode and electric motor operation mode changes according to the running state of the vehicle. Where the aforementioned hybrid vehicle is configured such that a compressor that actuates the refrigeration cycle constituting an air conditioner receives drive power from the engine, the compressor cannot receive the required drive power from the engine at all times. Therefore, hybrid vehicles use a motor-driven compressor that is driven by electric power obtained, for example, from a battery installed on the vehicle. The motor-driven compressor is attached to the vehicle body or engine.

However, a hybrid vehicle is sometimes operated only by the electric motor in a state in which the engine is stopped, for example, in an idle reduction mode, and where the motor-driven compressor is operated when the engine is thus stopped, unpleasant noise is generated inside and outside the vehicle due to the operation of the motor-driven compressor. This noise includes emitted noise that is generated by the operating motor-driven compressor itself and resonance noise generated by vibrations of the motor-driven compressor amplifying vibrations of the vehicle body or engine via the attachment parts of the motor-driven compressor. Accordingly, arts for reducing noise from the motor-driven compressor have been suggested.

Japanese Utility Model Application Publication No. S64-44810 describes a structure in which screws are inserted in through holes of cylindrical mountings attached to a compressor and the screws are screwed into the threaded holes of the attachment body of an engine, thereby mounting the compressor to the attachment body. Further, vibration-damping rubber is wound about the outer circumferential surfaces of the cylindrical mountings. In a state in which the cylindrical mountings with the vibration-damping rubber wound thereon are disposed on the inner side of semicircular curl portions of a base mounting, the base mounting is fixed to the outer side of the compressor by screwing and mounting to the compressor. In this case, the vibration-damping rubber is interposed between the base mounting and the cylindrical mounting and between the compressor and the cylindrical mounting.

In the compressor described in Japanese Utility Model Application Publication No. S64-44810, the transmission of vibrations of the compressor to the cylindrical mountings is reduced by the vibration-damping rubber, and the transmission of vibrations to the attachment body to which the compressor is attached, that is, to the engine, is thus reduced thereby making it possible to reduce resonance noise. However, the problem associated with the compressor described in the aforementioned publication is that the operating noise of the compression mechanism located inside the compressor cannot be prevented from being emitted as emitted noise from the housing thereof.

SUMMARY OF THE INVENTION

The present invention has been created to resolve the above-described problems, and it is an object of the present invention to provide a motor-driven compressor in which noise generated by transmission of vibrations to the vehicle on which the motor-driven compressor is installed and noise generated by the emission of operating noise can be reduced.

In order to resolve the above-described problems, the present invention provides a motor-driven compressor to be mounted to an attachment section of a vehicle. The motor-driven compressor includes: a compression unit that compresses a fluid suctioned from outside and then discharges the compressed fluid; an electric drive unit that drives the compression unit; and a case having a main body formed from a resin and covering at least the compression unit and a mounting portion that is provided integrally with the main body and configured to be mounted to the attachment section, wherein the mounting portion has a tubular body provided integrally with the main body and a fastening member inserted into the tubular body for mounting the tubular body to the attachment section, and wherein the main body is interposed between the compression unit and the tubular body.

DESCRIPTION OF THE PREFERRED EMBODIMENTS

The embodiments of the present invention will be described below with reference to the appended drawings.

First Embodiment

First, the construction of a motor-driven compressor 101 according to a first embodiment of the present invention will be explained. In this embodiment, the motor-driven compressor 101 is mounted to attachment bases 61 and 62, which are attachment sections in an engine installed on a vehicle, and constitutes a refrigeration device of an air conditioner of the vehicle which causes a refrigerant to circulate.

Figure 1:
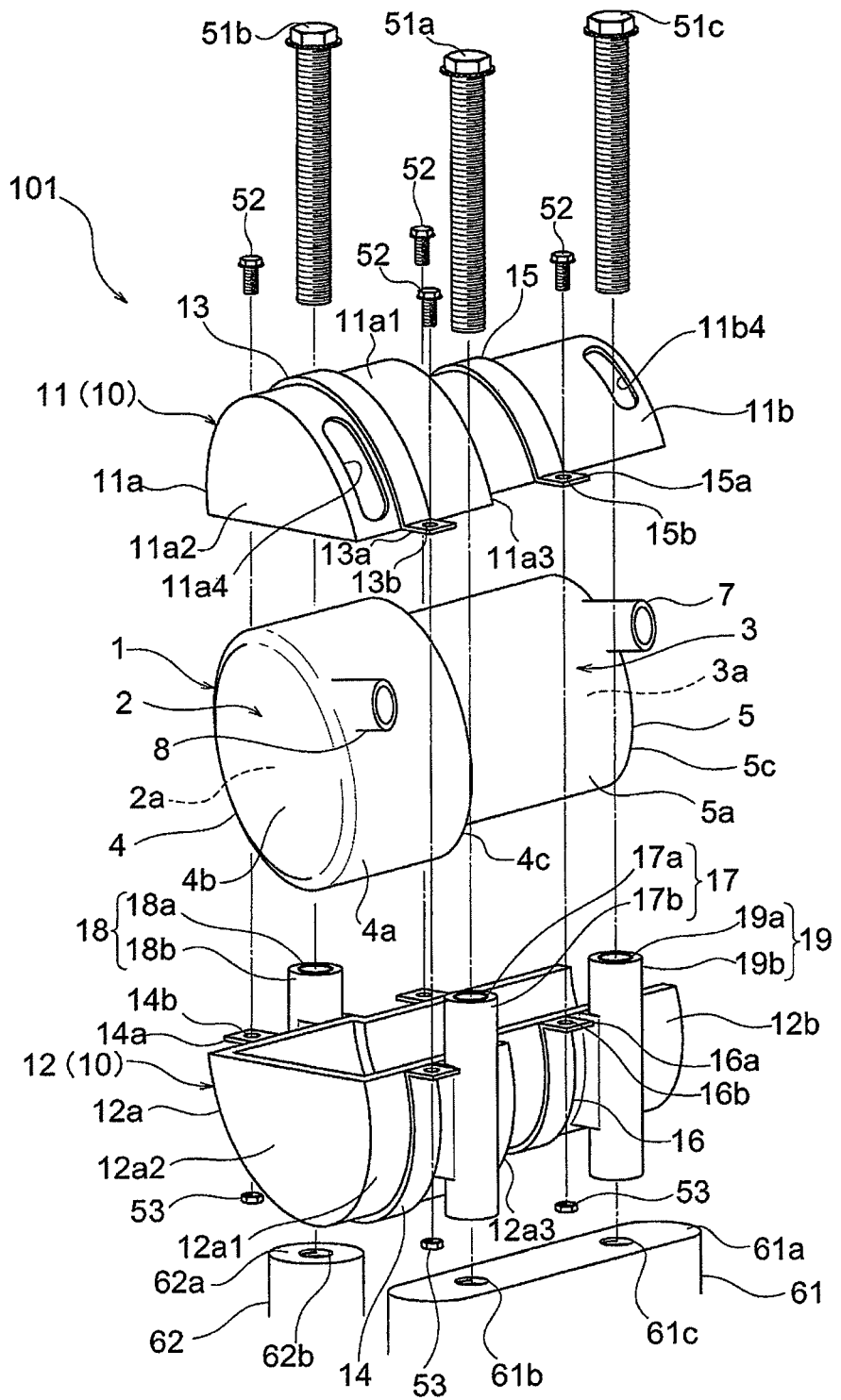
FIG. 1 is an exploded perspective view of a case of a motor-driven compressor according to a first embodiment of the present invention.

Referring to FIG. 1, the motor-driven compressor 101 includes a motor-driven compressor main body 1 and a case 10 surrounding the motor-driven compressor main body 1.

The motor-driven compressor main body 1 is constituted by a compression unit 2 and a drive unit 3 that drives the compression unit 2.

The compression unit 2 has a compression mechanism 2a that suctions a refrigerant, which is a fluid, from the outside, compresses the refrigerant that has been suctioned, and discharges the compressed refrigerant to the outside, and a compressor housing 4 including the compression mechanism 2a inside thereof. The drive unit 3 has an electric motor 3a that receives a supply of electric power from the outside and drives the compression mechanism 2a and a motor housing 5 including the motor 3a inside thereof. The compressor housing 4 and the motor housing 5 are integrated and form a single housing. In this configuration, the compressor housing 4 constitutes a housing of the compression unit 2.

Both the compressor housing 4 and the motor housing 5 have a cylindrical shape and are formed from a metal such as an aluminum alloy and integrated by joining at the end portions of the cylinders. Thus, the compressor housing 4 formed as a cylinder with a diameter larger than that of the motor housing 5 is formed by a cylindrical side portion 4a, an end portion 4b that closes the end of the side portion 4a on the opposite side of the motor housing 5, and an end portion 4c that closes the end of the side portion 4a on the motor housing 5 side. The motor housing 5 is formed by a cylindrical side portion 5a, and an end portion 5c that closes the end of the side portion 5a on the opposite side of the compressor housing 4. The end of the side portion 5a on the compressor housing 4 side is connected to the end portion 4c of the compressor housing 4.

The motor-driven compressor main body 1 has a suction pipe 7 for suctioning a refrigerant from the outside on the side portion 5a of the motor housing 5 and also has a discharge pipe 8 for discharging the refrigerant compressed by the compression mechanism 2a to the outside on the side portion 4a of the compressor housing 4. The suction pipe 7 is molded integrally with the motor housing 5 and disposed on the end portion 5c side of the side portion 5a. The discharge pipe 8 is molded integrally with the compressor housing 4 and disposed on the end portion 4b side of the side portion 4a.

The case 10 includes a semicylindrical first case portion 11 that covers the compressor housing 4 and the motor housing 5 from the side where the suction pipe 7 and the discharge pipe 8 are provided and a semicylindrical second case portion 12 that covers the compressor housing 4 and the motor housing 5 from the opposite side of the first case portion 11.

In this configuration, the case 10 constitutes a case, and the first case portion 11 and the second case portion 12 constitute a main body.

The first case portion 11 and the second case portion 12 are put on the compressor housing 4 and the motor housing 5 and joined together to form one substantially cylindrical case 10 that entirely covers the compressor housing 4 and the motor housing 5. More specifically, the first case portion 11 and the second case portion 12 are formed to cover the respective halves of the side portion 4a, halves of the end portion 4b and halves of the end portion 4c in the compressor housing 4, and the respective halves of the side portion 5a in the motor housing 5. In other words, the case 10 entirely covers the compressor housing 4 and the motor housing 5 except for the end portion 5c of the motor housing 5 (see FIG. 2).

Further, the first case portion 11 and the second case portion 12 are formed from a resin. The resin forming the first case portion 11 and the second case portion 12 has good adhesion to metals, a good vibration damping property, that is, vibration suppression ability, and rigidity. A material with a flexural modulus of 100 MPa to 10,000 MPa can be used for the abovementioned resin. Examples of materials that can be used as the resin forming the first case portion 11 and the second case portion 12 include PP (polypropylene), PBT (polybutylene terephthalate, that is, a PBT resin), PVC (vinyl chloride resin, that is, polyvinyl chloride), PUR (polyurethanes), PTFE (fluororesin), PF (phenolic resins), PC (polycarbonates), PA (polyamides, that is, Nylon), ABS (ABS resins), carbon plastics, and mixtures thereof. Fiber-reinforced plastics (FRP) may also be used as the resin forming the first case portion 11 and the second case portion 12.

It is further preferred that a loss factor representing the vibration damping property of the resin forming the first case portion 11 and the second case portion 12 be larger than that of the metal forming the compressor housing 4 and the motor housing 5, for example, 0.01 to 1. For example, the loss factor of an aluminum alloy which is an example of the metal forming the compressor housing 4 and the motor housing 5 is 0.0001.

Further, the first case portion 11 is formed by a first compressor cover portion 11a that covers the compressor housing 4 and a first motor cover portion 11b that covers the motor housing 5.

The first compressor cover portion 11a is formed by a side cover portion 11a1 that covers the side portion 4a of the compressor housing 4 and end cover portions 11a2 and 11a3 that respectively cover the end portions 4b and 4c of the compressor housing 4. The inner sides of the side cover portion 11a1, end cover portion 11a2 and end cover portion 11a3 of the first compressor cover portion 11a are formed in shapes matching the shapes of the outer surfaces of the side portion 4a, end portion 4b and end portion 4c of the compressor housing 4 which is to be covered. Further, the inner side of the first motor cover portion 11b is formed in a shape matching the shape of the outer surface of the side portion 5a of the motor housing 5 which is to be covered.

Further, in the side cover portion 11a1 of the first compressor cover portion 11a in the first case portion 11, a through hole 11a4 for allowing the discharge pipe 8 to protrude to the outside of the first case portion 11 when mounting to the motor-driven compressor main body 1 is formed. In the first motor cover portion 11b, a through hole 11b4 for allowing the suction pipe 7 to protrude to the outside of the first case portion 11 when mounting to the motor-driven compressor main body 1 is formed.

Further, on the outer surface of the side cover portion 11a1 of the first compressor cover portion 11a in the first case portion 11, a reinforcing member 13 extending in a band-like manner along the circumferential direction of the side cover portion 11a1 is integrally provided. The reinforcing member 13 is formed from a metal plate. Further, the reinforcing member 13 is provided along the entire circumferential direction of the side cover portion 11a1 and has ribs 13a protruding outward from both ends of the side cover portion 11a1. A bolt hole 13b is formed through each rib 13a.

Further, on the outer surface of the first motor cover portion 11b in the first case portion 11, a reinforcing member 15 extending in a band-like manner along the circumferential direction of the first motor cover portion 11b is integrally provided. The reinforcing member 15 is formed from a metal plate. Further, the reinforcing member 15 is provided along the entire circumferential direction of the first motor cover portion 11b and has ribs 15a protruding outward from both ends of the first motor cover portion 11b. A bolt hole 15b is formed through each rib 15a.

The first compressor cover portion 11a, first motor cover portion 11b, reinforcing member 13 and reinforcing member 15 are integrally formed by a resin molding method such as insert molding.

The second case portion 12 is formed by a second compressor cover portion 12a that covers the compressor housing 4 and a second motor cover portion 12b that covers the motor housing 5.

The second compressor cover portion 12a is formed by a side cover portion 12a1 that covers the side portion 4a of the compressor housing 4 and end cover portions 12a2 and 12a3 that respectively cover the end portions 4b and 4c of the compressor housing 4. The inner sides of the side cover portion 12a1, end cover portion 12a2 and end cover portion 12a3 of the second compressor cover portion 12a are formed in shapes matching the shapes of the outer surfaces of the side portion 4*a*, end portion 4*b* and end portion 4*c* of the compressor housing 4 which is to be covered. Further, the inner side of the second motor cover portion 12*b* is formed in a shape matching the shape of the outer surface of the side portion 5*a* of the motor housing 5 which is to be covered.

Cylindrical mounting portions 17 and 18 are integrally formed at both sides of the side cover portion 12*a*1 of the second compressor cover portion 12*a* in the second case portion 12. A cylindrical mounting portion 19 is integrally formed at the side of the second motor cover portion 12*b*.

The mounting portions 17 to 19 have similar constructions. The mounting portions 17 to 19 are respectively formed by tubular members 17*a* to 19*a*, which are cylindrical tubular bodies made from a metal, and tubular cover portions 17*b* to 19*b* constituted by a resin and formed so as to surround the cylindrical outer surface of the tubular members 17*a* to 19*a*. The tubular cover portions 17*b* and 18*b* are integrally molded from the same material as the second compressor cover portion 12*a*, and the tubular cover portion 19*b* is integrally molded from the same material as the second motor cover portion 12*b*. Therefore, the tubular cover portions 17*b* and 18*b* are included in the second compressor cover portion 12*a* and form part thereof, and the tubular cover portion 19*b* is included in the second motor cover portion 12*b* and forms part thereof. The mounting portions 17 to 19 constitute a mounting portion.

On the outer surface of the side cover portion 12*a*1 of the second compressor cover portion 12*a* in the second case portion 12, a reinforcing member 14 extending in a band-like manner along the circumferential direction of the side cover portion 12*a*1 is integrally provided. The reinforcing member 14 is formed from a metal plate. Further, the reinforcing member 14 is provided along the entire circumferential direction of the side cover portion 12*a*1 and has ribs 14*a* protruding outward from both ends of the side cover portion 12*a*1. A bolt hole 14*b* is formed through each rib 14*a*. The reinforcing member 14 is disposed so that, when the first case portion 11 and the second case portion 12 are joined together, the bolt holes 14*b* of the reinforcing member 14 are respectively aligned with the bolt holes 13*b* of the reinforcing member 13 and the reinforcing member 14 forms a single annular reinforcing member together with the reinforcing member 13.

On the outer surface of the second motor cover portion 12*b* in the second case portion 12, a reinforcing member 16 extending in a band-like manner along the circumferential direction of the second motor cover portion 12*b* is integrally provided. The reinforcing member 16 is formed from a metal plate. Further, the reinforcing member 16 is provided along the entire circumferential direction of the second motor cover portion 12*b* and has ribs 16*a* protruding outward from both ends of the second motor cover portion 12*b*. A bolt hole 16*b* is formed thorough each the rib 16*a*. The reinforcing member 16 is disposed so that, when the first case portion 11 and the second case portion 12 are joined together, the bolt holes 16*b* of the reinforcing member 16 are respectively aligned with the bolt holes 15*b* of the reinforcing member 15 and the reinforcing member 16 forms a single annular reinforcing member together with the reinforcing member 15.

The second compressor cover portion 12*a*, second motor cover portion 12*b*, reinforcing member 14, reinforcing member 16, tubular members 17*a* to 19*a* of the mounting portions 17 to 19, and tubular cover portion 17*b* to 19*b* of the mounting portions 17 to 19 are integrally formed by a resin molding method such as insert molding.

In this configuration, the reinforcing members 13 and 15 constitute a first fixture, and the reinforcing members 14 and 16 constitute a second fixture.

The mounting of the motor-driven compressor 101 to the vehicle engine is performed in a state in which the case 10 is mounted to the motor-driven compressor main body 1. In other words, the motor-driven compressor 101 is shipped from a compressor production plant or the like to a vehicle production plant as an assembly in which the case 10 is mounted to the motor-driven compressor main body 1, and the assembly is mounted to a vehicle engine at the vehicle production plant.

In this case, the motor-driven compressor 101 as the assembly is assembled by covering the motor-driven compressor main body 1 with the first case portion 11 and the second case portion 12 of the case 10, inserting bolts 52 through the bolt holes 13*b* and bolt holes 14*b* and fastening the bolts 52 with a nut 53 to join the reinforcing member 13 and the reinforcing member 14 together, and inserting bolts 52 through bolt holes 15*b* and bolt holes 16*b* and fastening the bolts 52 with a nut 53 to join the reinforcing member 15 and the reinforcing member 16 together. As a result, the first case portion 11 and the second case portion 12 are joined together and fixed to each other.

Figure 3:
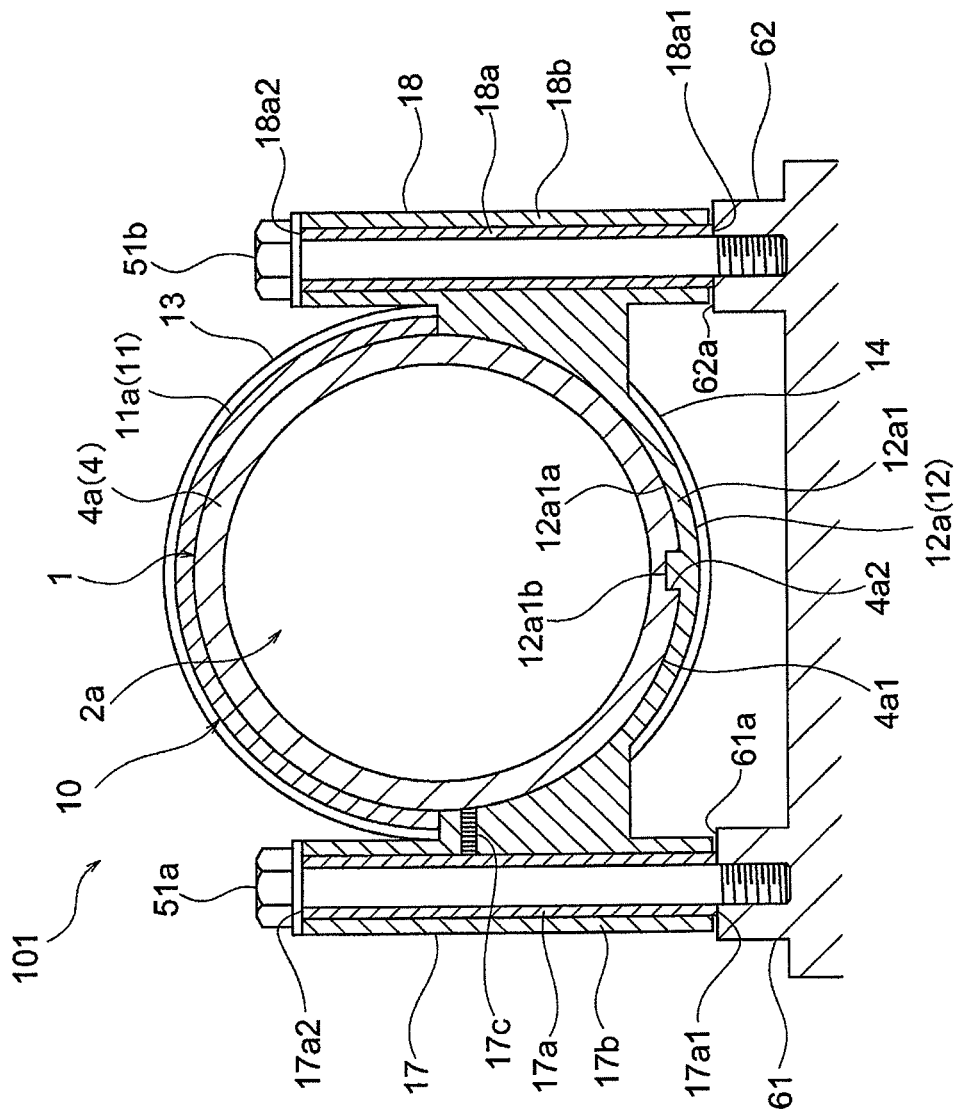
FIG. 3 is a cross-sectional view taken along the line in FIG. 2.

Further, referring to FIG. 3, a recess 4*a*2 is formed in the outer surface 4*a*1 of the side portion 4*a* in the compressor housing 4 of the motor-driven compressor main body 1. Furthermore, a protrusion 12*a*1*b* which protrudes inward and has a shape matching that of the recess 4*a*2 is integrally molded at an inner surface 12*a*1*a* of the side cover portion 12*a*1 in the second case portion 12 of the case 10. Therefore, when the motor-driven compressor 101 is assembled, the motor-driven compressor main body 1 is aligned with respect to the second case portion 12 by engaging the protrusion 12*a*1*b* with the recess 4*a*2.

Figure 2:
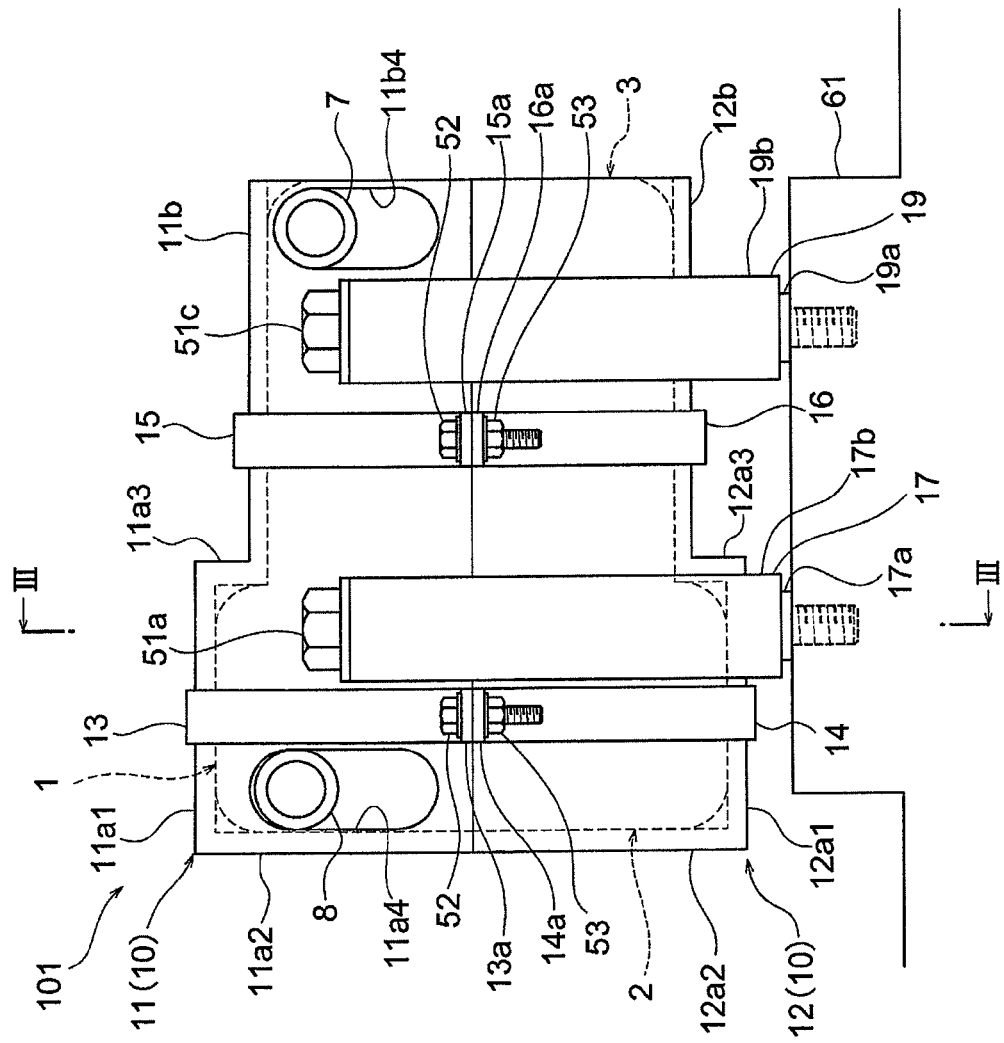
FIG. 2 is a side view of the motor-driven compressor having the case shown in FIG. 1 mounted thereto.

Referring to FIGS. 1 and 2, the mounting of the motor-driven compressor 101 to the vehicle engine is performed by fixing the mounting portions 17, 18 and 19 of the case 10 to the attachment bases 61 and 62 formed integrally with the engine. More specifically, bolts 51*a*, 51*b* and 51*c*, which are fastening members having a male thread, are respectively inserted through the mounting portions 17, 18 and 19, and the bolts 51*a*, 51*b* and 51*c* are respectively screwed into and tightened in a female-threaded hole 61*b* formed in a flat attachment surface 61*a* of the attachment base 61, a female-threaded hole 62*b* formed in a flat attachment surface 62*a* of the attachment base 62, and a female-threaded hole 61*c* formed in the attachment surface 61*a* of the attachment base 61, thereby fixing the mounting portions 17, 18 and 19 to the attachment bases 61 and 62 and mounting and fixing the motor-driven compressor 101 to the engine.

Referring to FIG. 3, in this case, in the mounting portions 17 and 18 of the motor-driven compressor 101, the length of the tubular members 17*a* and 18*a* in the axial direction of cylinder thereof is larger than the length of the tubular cover portions 17*b* and 18*b*. Further, ends 17*a*1 and 17*a*2 of the tubular member 17*a* respectively abut on the attachment surface 61*a* of the attachment base 61 and the bolt 51*a* and the tubular member 17*a* supports a compressive force created by fastening the bolt 51*a*. Therefore, the tubular cover portion 17*b* does not receive the compressive force from the bolt 51*a*. Ends 18*a*1 and 18*a*2 of the tubular member 18*a* respectively abut on the attachment surface 62*a* of the attachment base 62 and the bolt 51*b* and the tubular member 18*a* supports a compressive force created by fastening the bolt 51*b*. Therefore, the tubular cover portion 18*b* does not receive the compressive force from the bolt 51*b*. Likewise, in the mounting portion 19, the tubular member 19*a* supports a compressive force created by fastening the bolt 51*c*, and the tubular cover portion 19*b* does not receive the compressive force from the bolt 51*c* (also see FIG. 2).

Further, in the side cover portion 12*a*1 of the second case portion 12 in the case 10 of the motor-driven compressor 101, a ground member 17*c* that extends from an inner surface 12*a*1*a* of the side cover portion 12*a*1 to the tubular member 17*a* is embedded. The ground member 17*c* is constituted by a wire-like or thin foil-like member made from a metal or the like, so as to have electric conductivity and flexibility similar to those of the second case portion 12 made from a resin. Therefore, the ground member 17*c* electrically connects the compressor housing 4 and the tubular member 17*a*. As a result, in the motor-driven compressor 101 mounted to the attachment bases 61 and 62, the compressor housing 4 and the motor housing 5 (see FIG. 1) are electrically connected by the ground member 17*c* and the tubular member 17*a* to the attachment base 61 and then to the engine and the vehicle. In this configuration, the ground member 17*c* constitutes a conductive member.

The operation of the motor-driven compressor 101 according to the first embodiment of the present invention will be described below.

Referring to FIGS. 1 and 2, in the motor-driven compressor 101, the motor 3*a* is actuated by supplying electric power from the outside. The compression mechanism 2*a* is thereby driven. As a result, the compression mechanism 2*a* suctions a refrigerant from a refrigeration circuit of the vehicle (not shown) through the suction pipe 7. The refrigerant that has been suctioned passes inside through the motor housing 5 and is suctioned to the compression mechanism 2*a* of the compressor housing 4. Further, the refrigerant is compressed by the compression mechanism 2*a* and then discharged from the discharge pipe 8 to the refrigeration circuit. The refrigeration circuit is provided with the motor-driven compressor 101 and also a condenser, an expansion valve and an evaporator (not shown).

In this case, operational noise generated in the operating motor 3*a* is emitted through the motor housing 5, and vibrations of the motor 3*a* also induce vibrations in the motor housing 5. Further, the operational noise generated in the operating compression mechanism 2*a* is emitted through the compression housing 4, and vibrations of the compression mechanism 2*a* also induce vibrations in the compressor housing 4.

The first motor cover portion 11*b* and the second motor cover portion 12*b* that are made from a resin in the case 10 cover the entire side portion 5*a* occupying most of the surface area of the motor housing 5. Therefore, emission of the operational noise from the motor housing 5 can be inhibited in a wide region of the motor housing 5.

Furthermore, referring also to FIG. 3, vibrations of the motor housing 5 generated when the motor 3*a* operates are transmitted to the first motor cover portion 11*b* and the second motor cover portion 12*b* of the case 10 adjacent to the motor housing 5.

Since the first motor cover portion 11*b* and the second motor cover portion 12*b* that are made from a resin have a large loss factor, the vibrations transmitted to the first motor cover portion 11*b* and the second motor cover portion 12*b* are attenuated therein, thereby suppressing the transmission of the vibrations to the tubular member 19*a* that is in contact with the tubular cover portion 19*b* formed integrally with the second motor cover portion 12*b*. Further, even though the tubular cover portion 19*b* is in contact with the bolt 51*c* or the attachment base 61, since the vibrations transmitted to the tubular cover portion 19*b* are attenuated, the transmission thereof to the bolt 51*c* and the attachment base 61 is suppressed.

As a result, the operational noise and vibrations generated in the motor 3*a* are significantly less than those of the compression mechanism 2*a*, but the operational noise emitted from the motor housing 5 can be suppressed to an even lower level and the resonance noise generated due to the transmission of vibrations of the motor housing 5 to the vehicle through the engine (not shown) can be suppressed to an even lower level.

Further, returning to FIGS. 1 and 2, when the compression mechanism 2*a* is actuated, operational noise and vibrations are generated, but large operational noise and vibrations are generated when the compressed refrigerant is discharged on the discharge side thereof.

The first compressor cover portion 11*a* and the second compressor cover portion 12*a* that are made from a resin in the case 10 cover the entire surface of the compressor housing 4. Therefore, the emission of operational noise generated by the compression mechanism 2*a* is suppressed over the entire region of the compressor housing 4. In particular, strong operational noise generated on the discharge side close to the discharge pipe 8 is effectively prevented from being emitted to the outside since the end portion 4*b* and the side portion 4*a* of the compressor housing 4 are covered by the first compressor cover portion 11*a* and the second compressor cover portion 12*a*.

Further, referring also to FIG. 3, the vibrations of the compressor housing 4 generated during the compression mechanism 2*a* operating are transmitted to the first compressor cover portion 11*a* and the second compressor cover portion 12*a* of the case 10 adjacent to the compressor housing 4.

The vibrations transmitted to the first compressor cover portion 11*a* and the second compressor cover portion 12*a* that are made from a resin are attenuated therein and the transmission of the vibrations to the tubular members 17*a* and 18*a* that are respectively in contact with the tubular cover portions 17*b* and 18*b* integrated with the second compressor cover portion 12*a* is suppressed. Further, even though the tubular cover portions 17*b* and 18*b* are in contact with the bolt 51*a* or 51*b* or with the attachment base 61 or 62, since the vibrations transmitted to the tubular cover portion 17*b* and 18*b* are attenuated, the transmission thereof to the bolts 51*a* and 51*b* and the attachment bases 61 and 62 is suppressed.

As a result, the operational noise emitted from the compressor housing 4 is reduced and the resonance noise generated due to the transmission of vibrations of the compressor housing 4 to the vehicle through the engine (not shown) is reduced.

Further, since the first compressor cover portion 11*a* and the second compressor cover portion 12*a* are formed from a resin with a flexural modulus of 100 MPa to 10,000 MPa and have a high rigidity, the deformation occurring in the first compressor cover portion 11*a*, second compressor cover portion 12*a* and also tubular cover portions 17*b* and 18*b* due to vibrations of the compressor housing 4 are suppressed. As a result, the displacement of the motor-driven compressor main body 1 with respect to the attachment bases 61 and 62 is suppressed and the increase in the amplitude of vibrations of the motor-driven compressor main body 1 is inhibited.

As described hereinabove, the motor-driven compressor 101 in accordance with the present invention is configured to be mounted to the attachment bases 61 and 62 of a vehicle engine. The motor-driven compressor 101 includes a compression unit 2 that compresses a refrigerant suctioned from outside and then discharges the compressed refrigerant; an electric drive unit 3 that drives the compression unit 2; and a case 10 which has a first case portion 11 and a second case portion 12 that are formed from a resin and cover at least the compression unit 2 and mounting portions 17, 18, 19 that are provided integrally with the second case portion 12 and configured to be mounted to the attachment bases 61, 62. The mounting portions 17, 18, 19 have tubular members 17a, 18a, 19a provided integrally with the second case portion 12, and bolts 51a, 51b, 51c respectively inserted into the tubular members 17a, 18a, 19a for mounting the tubular members 17a, 18a, 19a to the attachment bases 61, 62. The second case portion 12 is interposed between the compression unit 2 and the tubular members 17a, 18a.

In this case, the tubular cover portions 17b, 18b and 19b of the second case portion 12 constituted by a resin with a good vibration damping property are interposed between the tubular members 17a, 18a, 19a that are in contact with the attachment bases 61, 62 and the compressor housing 4 of the compression unit 2. As a result, all the vibrations generated from the compressor housing 4 are transmitted to the tubular members 17a, 18a, 19a through the first case portion 11, second case portion 12 and tubular cover portions 17b, 18b and 19b, but are attenuated in the transmission process by the first case portion 11, second case portion 12 and tubular cover portions 17b, 18b and 19b. Therefore, the vibrations transmitted from the motor-driven compressor 101 to the engine, that is, to the vehicle, through the attachment bases 61, 62 can be reduced, thereby making it possible to reduce resonance noise in the vehicle. Further, since the case 10 covers at least the compressor housing 4 by the first case portion 11 and the second case portion 12 made from a resin, the emission of operational noise of the compression mechanism 2a from the compressor housing 4 can be reduced. Therefore, in the motor-driven compressor 101, both the resonance noise generated due to the transmission of vibrations to the vehicle where the motor-driven compressor 101 is installed and the emission noise generated due to the emission of operational noise of the compression mechanism 2a from the compressor housing 4 can be reduced.

Since the noise can be effectively reduced in the motor-driven compressor 101, the motor-driven compressor 101 can be configured to use high-speed operation by utilizing a small-capacity compression mechanism 2a. As a result, the motor-driven compressor 101 can be reduced in size and cost.

Furthermore, in the motor-driven compressor 101, the compressor housing 4 and motor housing 5 are separated from the mounting portions 17, 18 and 19. Therefore, it is not necessary to design the compressor housing 4 and the motor housing 5 to match the arrangement of the attachment bases 61 and 62 and a common housing can be used for installation on various vehicles with different arrangements of attachment bases 61 and 62, thereby making it possible to reduce cost.

Further, the motor-driven compressor 101 is configured such that the compressor housing 4 and the motor housing 5 which are accommodated in the case 10 are mounted to the attachment bases 61 and 62, and the mounting portions 17, 18 and 19 are integrated with the case 10. Therefore, the compressor housing 4 and the motor housing 5 can have a simple shape such as a cylindrical shape. By simplifying the shape of the compressor housing 4 and the motor housing 5 made from an aluminum alloy, it is possible to reduce cavities which appear during casting of the aluminum alloy and pass through the compressor housing 4 and the motor housing 5, thereby improving the quality of the compressor housing 4 and the motor housing 5.

Further, in the motor-driven compressor 101, by changing the type of the resin constituting the case 10, the first case portion 11, second case portion 12 and tubular cover portions 17b, 18b and 19b can be provided with a vibration suppression characteristic matching the resonance characteristic of the vehicle where the motor-driven compressor 101 is installed.

Further, in the motor-driven compressor 101, the resin forming the first case portion 11 and the second case portion 12 has a vibration damping property superior to the vibration damping property of the material forming the compressor housing 4 of the compression unit 2. As a result, the vibrations transmitted from the compressor housing 4 to the first case portion 11 and the second case portion 12 can be effectively attenuated.

Further, in the motor-driven compressor 101, the first case portion 11 and the second case portion 12 can be joined to and separated from each other, and the case 10 has reinforcing members 13 to 16 for fixing together the first case portion 11 and the second case portion 12 that have been joined together. As a result, the operation of mounting the case 10 to the motor-driven compressor main body 1 can be facilitated.

Further, in the motor-driven compressor 101, the reinforcing members 13 and 15 are made from a metal and provided at the first case portion 11, and the reinforcing members 14 and 16 are made from a metal and provided at the second case portion 12. Furthermore, where the reinforcing members 13 and 14 are connected together and the reinforcing members 15 and 16 are connected together, the reinforcing members 13 to 16 fix the first case portion 11 and the second case portion 12 that have been joined together and surround the periphery of the above first case portion 11 and second case portion 12. As a result, the reinforcing members 13 to 16 increase the strength of the first case portion 11 and the second case portion 12 made from a resin and also increase the joining strength thereof, thereby making it possible to prevent the first case portion 11 and the second case portion 12 from deformation and damage caused by the vibrations of the compression unit 2 and the drive unit 3.

In the motor-driven compressor 101, the tubular members 17a, 18a and 19a are made from a metal and support the fastening force created by the bolts 51a, 51b and 51c between the attachment bases 61, 62 and the bolts 51a, 51b and 51c. In this case, by constructing the tubular cover portions 17b, 18b and 19b of the second case portion 12 to prevent the compressive force created by the bolts 51a, 51b and 51c from acting thereupon, the compressive force acting upon the tubular cover portions 17b, 18b and 19b can be reduced. As a result, fatigue and creep induced in the tubular cover portions 17b, 18b and 19b by the compressive force can be reduced. Further, since the fastening force of the bolts 51a, 51b and 51c can be increased, the mounting of the tubular members 17a, 18a and 19a to the attachment bases 61 and 62 can be strengthened.

In the motor-driven compressor 101, the second case portion 12 integrally includes the flexible and conductive ground member 17c which electrically connects the tubular member 17a to the compression unit 2 located inside the first case portion 11 and the second case portion 12. In this case, where the tubular member 17a is made from a metal, by merely mounting the motor-driven compressor 101 where the motor-driven compressor main body 1 is accommodated in the case 10 to the attachment bases 61 and 62, the compressor housing 4 can be electrically connected to the attachment base 61, that is, to the vehicle, by the ground member 17c and the tubular member 17a. As a result, when the motor-driven compressor 101 is installed on a vehicle, the operation of leading out a ground cable is unnecessary and the number of operations is reduced, thereby reducing cost.

Further, in the motor-driven compressor 101, the first case portion 11 and the second case portion 12 also cover at least part of the drive unit 3. As a result, the first case portion 11 and the second case portion 12 can suppress the emission of operational noise of the motor 3a from the motor housing 5, and the noise generated by the motor-driven compressor 101 can be further reduced.

Second Embodiment

A motor-driven compressor 201 according to a second embodiment of the present invention has a construction where the first case portion 11 and the second case portion 12 of the case 10, which cover the compressor housing 4 and the motor housing 5 in the motor-driven compressor 101 of the first embodiment, are modified so as to cover only the compressor housing 4.

In the below-described embodiment, reference numerals identical to those in the above-mentioned drawings denote same or similar constituent elements. Therefore, detailed explanation thereof is herein omitted.

Figure 4:
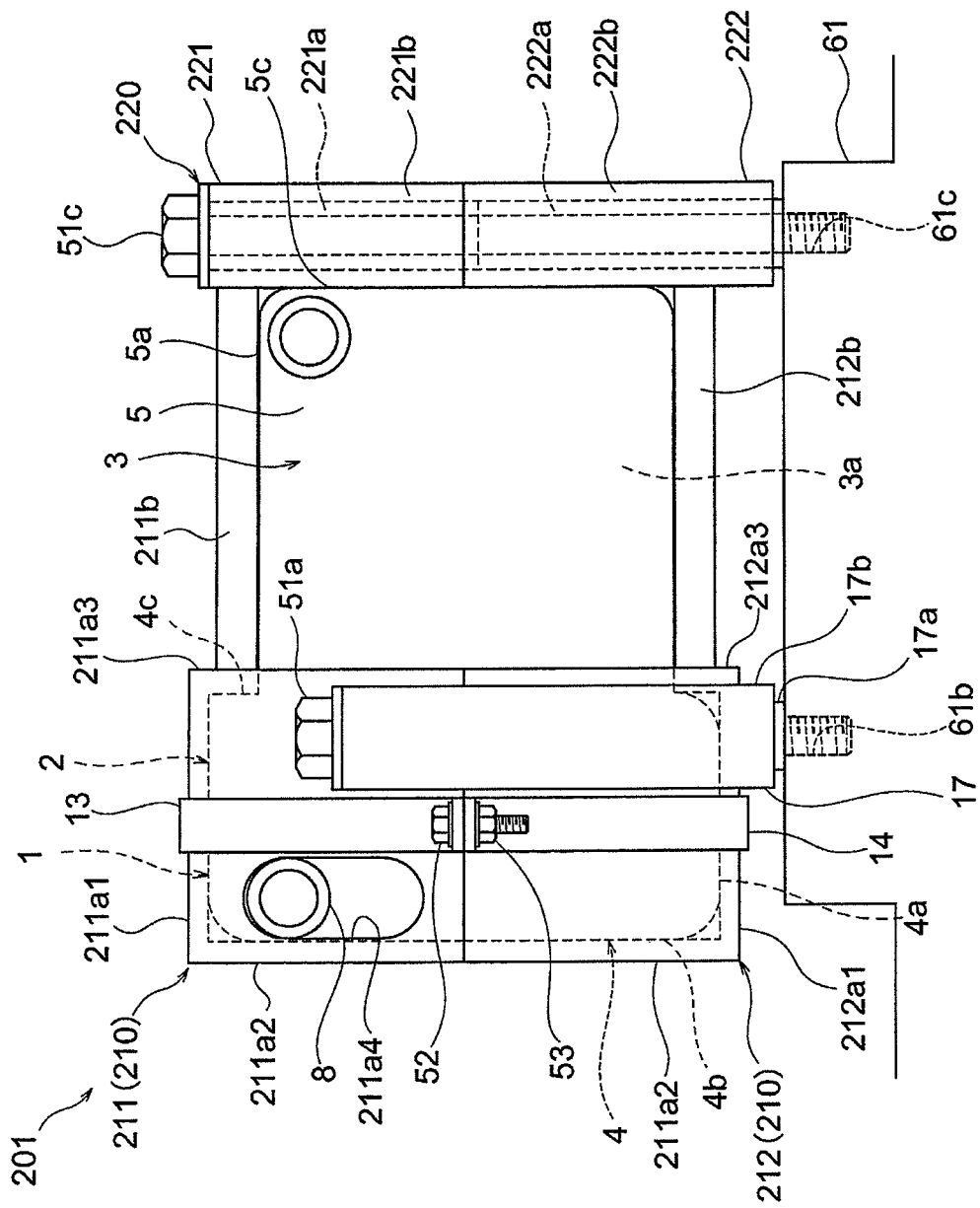
FIG. 4 is a side view illustrating, similarly to FIG. 2, a motor-driven compressor according to a second embodiment of the present invention having a case mounted thereto.

Referring to FIG. 4, a case 210 of the motor-driven compressor 201 includes a first case portion 211 and a second case portion 212 similarly to the motor-driven compressor 101 of the first embodiment, but the first case portion 211 and the second case portion 212 are formed to cover the respective halves of the side portion 4a, halves of the end portion 4b and halves of the end portion 4c in the compressor housing 4. Further, the inner sides of a side cover portion 211a1, an end cover portion 211a2 and an end cover portion 211a3 of the first case portion 211 are formed in a shape matching the shape of the outer surface of the side portion 4a, end portion 4b and end portion 4c of the compressor housing 4 to be covered. The inner sides of a side cover portion 212a1, an end cover portion 212a2, and an end cover portion 212a3 of the second case portion 212 are formed in a shape matching the shape of the outer surface of the side portion 4a, end portion 4b and end portion 4c of the compressor housing 4 to be covered.

Further, the reinforcing member 13 is integrally provided on the outer surface of the side cover portion 211a1 of the first case portion 211, and the reinforcing member 14 is integrally provided on the outer surface of the side cover portion 212a1 of the second case portion 212. A through hole 211a4 for allowing the discharge pipe 8 to protrude out of the first case portion 211 is formed in the side cover portion 211a1 of the first case portion 211.

The mounting portions 17 and 18 (see FIG. 1) are integrally formed on both sides of the side cover portion 212a1 of the second case portion 212.

A cylindrical mounting portion 220 extending in the same direction as the mounting portions 17 and 18 (see FIG. 1) is disposed to abut on the end portion 5c of the motor housing 5. The mounting portion 220 is connected to the first case portion 211 and the second case portion 212 by resin connection members 211b and 212b, respectively. The mounting portion 220 is constituted by a first mounting component 221 and a second mounting component 222 that can be connected to each other and separated from each other in the axial direction of cylinder. In this configuration, the mounting portion 220 constitutes a second mounting portion.

The first mounting component 221 and the second mounting component 222 are respectively formed by cylindrical tubular members 221a and 222a made from a metal and tubular cover portions 221b and 222b made from a resin and formed so as to surround the cylindrical outer surface of the tubular members 221a and 222a. The tubular member 221a protrudes from the tubular cover portion 221b at the second mounting component 222 side, and the tubular member 222a is shorter than the tubular cover portion 222b at the first mounting component 221 side. As a result, the first mounting component 221 and the second mounting component 222 are connected to each other when the tubular member 221a is fit into the tubular cover portion 222b. In this configuration, the tubular members 221a and 222a constitute a second tubular body, and the tubular cover portions 221b and 222b constitute a resin member.

The connection member 211b is molded integrally with and connects the first case portion 211 and the tubular cover portion 221b so that, when the case 210 is mounted to the motor-driven compressor main body 1, the connection member 211b extends along the side portion 5a of the motor housing 5. The connection member 212b is molded integrally with and connects the second case portion 212 and the tubular cover portion 222b so that, when the case 210 is mounted to the motor-driven compressor main body 1, the connection member 212b extends along the side portion 5a of the motor housing 5. The connection members 211b and 212b support and fix the motor housing 5 when the case 210 is fixed to the motor-driven compressor main body 1.

Further, the first case portion 211, reinforcing member 13, connection member 211b, and the tubular member 221a and the tubular cover portion 221b of the first mounting component 221 are formed integrally by a resin molding method such as insert molding. Further, the second case portion 212, the tubular members 17a and 18a (see FIG. 1) and the tubular cover portions 17b and 18b (see FIG. 1) of the mounting portions 17 and 18, reinforcing member 14, connection member 212b, and the tubular member 222a and the tubular cover portion 222b of the second mounting component 222 are formed integrally by a resin molding method such as insert molding.

Therefore, the motor-driven compressor 201 is assembled by covering the compressor housing 4 of the motor-driven compressor main body 1 with the first case portion 211 and the second case portion 212 of the case 210, fastening together the reinforcing members 13 and 14 with the bolts 52 and nuts 53, and fitting the first mounting component 221 with the second mounting component 222.

Further, the mounting of the assembled motor-driven compressor 201 to the attachment bases 61 and 62 (see FIG. 1) is performed by respectively inserting the bolts 51a, 51b (see FIG. 1) and 51c into the tubular member 17a of the mounting portion 17, the tubular member 18a (see FIG. 1) of the mounting portion 18, and the tubular members 221a and 222a of the mounting portion 220, and further fastening the bolts 51a, 51b and 51c by screwing into the female-threaded hole 61b of the attachment base 61, the female-threaded hole 62b (see FIG. 1) of the attachment base 62 and the female-threaded hole 61c of the attachment base 61. In this case, the bolt 51c constitutes a second fastening member.

During operation of the motor-driven compressor 201, the case 210 suppresses the emission of operational noise from the compressor housing 4 to the outside and also suppresses the transmission of vibrations of the compressor housing 4 to the attachment bases 61 and 62 (see FIG. 1) by the tubular members 17a and 18a and also bolts 51a and 51b (see FIG. 1), in the same manner as the case 10 of the first embodiment.

Other features and operations of the motor-driven compressor 201 according to the second embodiment of the present invention are similar to those of the first embodiment and the explanation thereof is herein omitted.

As described hereinabove, the effects obtained with the motor-driven compressor 201 of the second embodiment are similar to those obtained with the motor-driven compressor 101 of the aforementioned first embodiment.

Further, in the motor-driven compressor 201, the case 210 includes the mounting portion 220 that is provided in contact with the drive unit 3 and separately from the first case portion 211 and the second case portion 212. The mounting portion 220 has the tubular members 221*a* and 222*a*, the tubular cover portions 221*b* and 222*b* that are provided integrally with the tubular members 221*a* and 222*a* so as to be interposed between the tubular members 221*a* and 222*a* and the drive unit 3, the bolt 51*c* inserted into the tubular members 221*a* and 222*a* for mounting the tubular members 221*a* and 222*a* to the attachment base 61, and the connection members 211*b* and 212*b* that respectively connect the tubular members 221*a* and 222*a* with the first case portion 211 and the second case portion 212. As a result, noise generated in the compression unit 2 that has high operational noise and large vibrations can be reduced, whereas, since the motor housing 5 of the drive unit 3 that has low operational noise and small vibrations is not covered by the case 210, heat generated by the motor 3*a* therein can be dissipated thereby making it possible to increase durability of the motor 3*a*.

Figure 5:
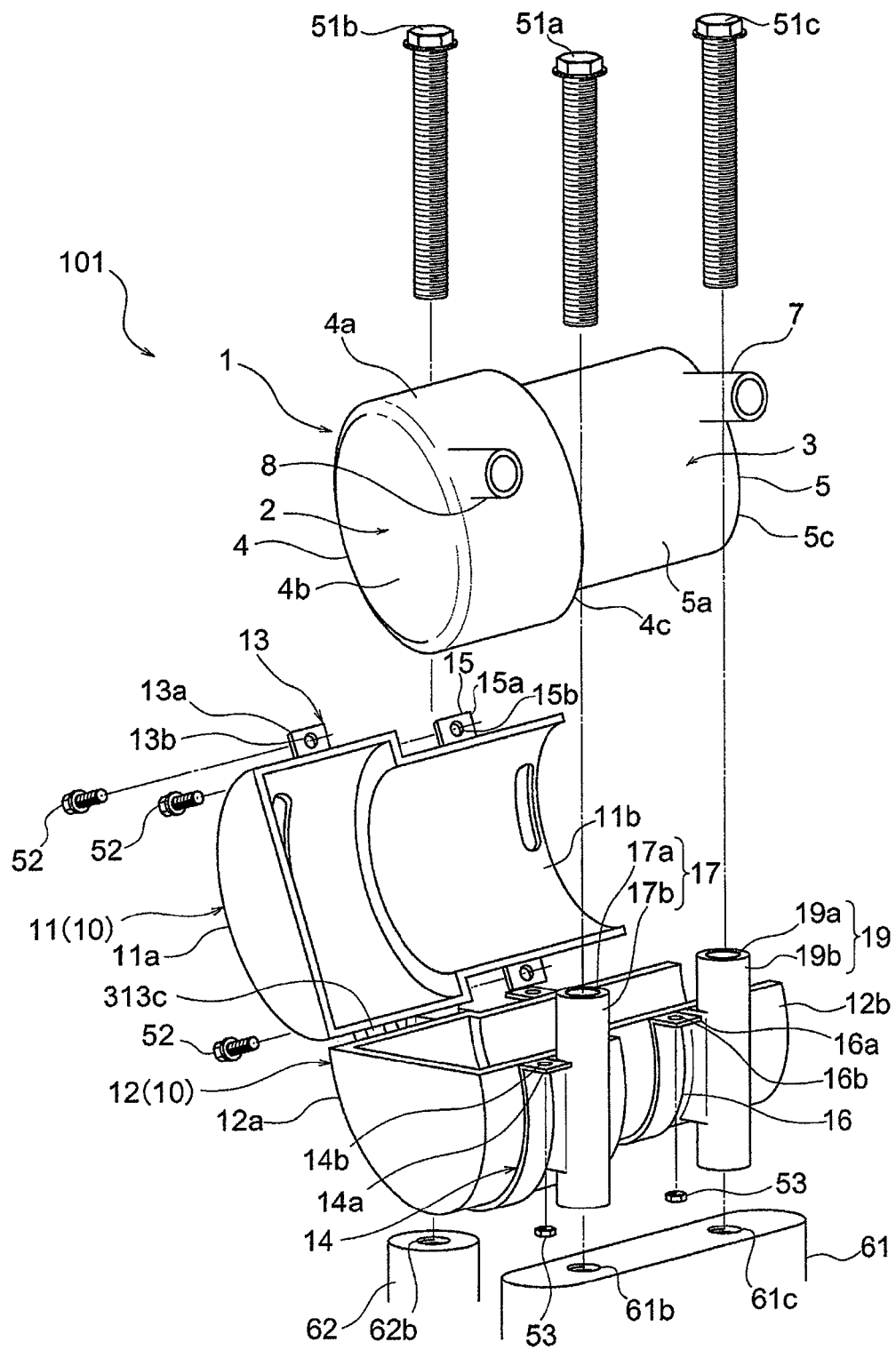
FIG. 5 is an exploded perspective view illustrating a variation example of the case of the motor-driven compressor according to the first embodiment of the present invention.

Further, in the motor-driven compressors 101 and 201 of the first and second embodiments, the first case portions 11, 211 and the second case portions 12, 212 are configured to be completely separated from each other, but such configuration is not limiting. Thus, as shown in FIG. 5, for example, the motor-driven compressor 101 may have a construction where a rib 13*a* and a bolt hole 13*b* are formed only at one end of the reinforcing member 13 provided at the first compressor cover portion 11*a* of the first case portion 11, a rib 14*a* and a bolt hole 14*b* are formed only at one end of the reinforcing member 14 provided at the second compressor cover portion 12*a* of the second case portion 12, and the other end of the reinforcing member 13 and the other end of the reinforcing member 14 are connected to each other with a hinge 313*c*. Also, the reinforcing members 15 and 16 may have a construction similar to the above reinforcing members 13 and 14. With such configuration, the operation of assembling the motor-driven compressor 101 in which the case 10 is mounted to the motor-driven compressor main body 1 can be further facilitated.

Further, in the motor-driven compressors 101 and 201 of the first and second embodiments, the cases 10, 210 have a construction of being divided into two sections, namely, the first case portions 11, 211 and the second case portions 12, 212, but such configuration is not limiting, and a non-divided construction may also be used. In such a case, the cases 10, 210 have a tubular shape with one end thereof being open, and the motor-driven compressor main body 1 is inserted into the case 10, 210 from the open end. The motor-driven compressor main body 1 may also be fixed to the case 10, 210 by a pin or the like inserted from the outside of the case 10, 210 through the case 10, 210 to engage with the motor-driven compressor main body 1.

Further, in the mounting portions 17, 18, 19 and 220 of the motor-driven compressors 101 and 201 of the first and second embodiments, the compressive force created by fastening the bolts 51*a*, 51*b* and 51*c* is supported by the metal tubular members 17*a*, 18*a*, 19*a*, 221*a* and 222*a*, but such configuration is not limiting. Thus, the tubular members 17*a*, 18*a*, 19*a*, 221*a* and 222*a* may be resin tubular members that have a loss factor larger than the loss factor of the metal constituting the compressor housing 4 and the motor housing 5 and a compressive strength capable of withstanding the compressive force created by fastening the bolts 51*a*, 51*b* and 51*c*. Further, in this case, the abovementioned resin tubular members 17*a*, 18*a* and 19*a* in the mounting portions 17, 18 and 19 and the second case portion 12 may be configured as a single member made from the same resin material. As a result, the number of parts is decreased and therefore the cost can be reduced.

Further, in the mounting portions 17, 18, 19 and 220 of the motor-driven compressors 101 and 201 of the first and second embodiments, the resin tubular cover portions 17*b*, 18*b*, 19*b*, 221*b* and 222*b* are respectively formed to surround the outer surface of the tubular members 17*a*, 18*a*, 19*a*, 221*a* and 222*a*, but such configuration in not limiting. In the case of the mounting portions 17, 18 and 19, the tubular cover portions 17*b*, 18*b* and 19*b* may be interposed as part of the second case portion 12 at least between the tubular members 17*a*, 18*a* and 19*a* and the compressor housing 4 or motor housing 5. Further, in the case of the mounting portion 220, the tubular cover portions 221*b* and 222*b* may be interposed at least between the tubular members 221*a*, 222*a* and the motor housing 5.

Further, in the motor-driven compressors 101 and 201 of the first and second embodiments, in order to align the motor-driven compressor main body 1 with the second case portion 12, 212 of the case 10, 210, the recess 4*a*2 is formed in the compressor housing 4 and the protrusion 12*a*1*b* is formed at the second case portion 12, 212, but such configuration is not limiting, and the arrangement of the recess and protrusion may be reversed.

Further, in the motor-driven compressors 101 and 201 of the first and second embodiments, the reinforcing members 13 to 16 fix the joined first case portion 11, 211 and the second case portion 12, 212, but such configuration is not limiting. Thus, protruding ribs may be integrally molded at the first case portion 11, 211 and the second case portion 12, 212, and the joined first case portion 11, 211 and the second case portion 12, 212 may be fixed by fastening the protruding ribs together by using bolts or the like.

Further, in the motor-driven compressors 101 and 201 of the first and second embodiments, the reinforcing members 13 to 16 are provided on the outer surfaces of the first case portions 11, 211 and the second case portions 12, 212, but such configuration is not limiting. The reinforcing members 13 to 16 may also be provided inside or on the inner surfaces of the first case portions 11, 211 and the second case portions 12, 212.

Further, in the motor-driven compressor 201 of the second embodiment, the connection members 211*b* and 212*b* are made from a resin, but such configuration is not limiting, and the connection members 211*b* and 212*b* may be made from a metal. In such case, the metal connection members 211*b* and 212*b* may respectively connect the reinforcing member 13 to the tubular member 221*a*, and the reinforcing member 14 to the tubular member 222*a*.

Further, in the motor-driven compressor 201 of the second embodiment, the tubular cover portions 221*b* and 222*b* of the mounting portion 220 are configured to abut on the end portion 5*c* of the motor housing 5, but such configuration is not limiting, and the end portion 5*c* of the motor housing 5 may be fit over the tubular cover portions 221*b* and 222*b*. As a result, the motor housing 5 is supported not only by the connection members 211*b* and 212*b*, but also by the mounting portion 220 and can be fixed more strongly.

Further, the cases 10 and 210 of the motor-driven compressors 101 and 201 of the first and second embodiments are provided on a motor-driven compressor mounted to the engine installed on a vehicle, but such configuration is not limiting. The cases 10 and 210 may be provided for a motor-driven compressor mounted to a travel electric motor in a fuel cell vehicle, an electric automobile, etc. Further, a motor-driven compressor to which the present invention can be applied is not limited to a refrigerant compressor for a refrigeration circuit, and the present invention can also be applied to other motor-driven compressors. For example, the present invention may be applied to an air compressor that is used in an air suspension apparatus of a vehicle, or a pump that is used for pumping hydrogen or air to a fuel cell stack in a fuel cell vehicle.

What is claimed:

1. A motor-driven compressor to be mounted to an attachment section of a vehicle, comprising:
    a compression unit that compresses a fluid suctioned from outside and then discharges the compressed fluid;
    an electric drive unit that drives the compression unit; and
    a case having a main body formed from a resin and covering at least the compression unit, and a mounting portion that is provided integrally with the main body and configured to be mounted to the attachment section, wherein
    the mounting portion has:
    a tubular body provided integrally with the main body; and
    a fastening member inserted into the tubular body for mounting the tubular body to the attachment section, and
    wherein the tubular body is made from a metal and supports a fastening force created by the fastening member between the attachment section and the fastening member;
    the main body is interposed between the compression unit and the tubular body;
    the main body is formed by a first case portion and a second case portion that are configured to be joined to and separated from each other;
    the second case portion and the tubular body are integrated by the resin;
    the case has a fixture comprised of a first fixture provided on an outer surface of the first case portion and a second fixture provided on an outer surface of the second case portion for fixing to each other the first case portion and the second case portion that have been joined together;
    the first case portion and the first fixture are integrated by the resin, and the second case portion and the second fixture are integrated by the resin;
    the first fixture is made from a metal and the second fixture is made from a metal, and
    the first fixture and the second fixture are connected to each other to fix the first case portion and the second case portion that have been joined together and surround a periphery of the first case portion and the second case portion that have been joined together.

2. The motor-driven compressor according to claim 1, wherein
    the resin forming the main body has a vibration damping property superior to a vibration damping property of a material forming a housing of the compression unit.

3. The motor-driven compressor according to claim 1, wherein
    the main body integrally includes a conductive member that is flexible and conductive and electrically connects the tubular body and the compression unit in the main body.

4. The motor-driven compressor according to claim 1, wherein
    the main body further covers at least part of the electric drive unit.

5. The motor-driven compressor according to claim 1, wherein
    the case has a second mounting portion that is provided in contact with the electric drive unit separately from the main body; and
    the second mounting portion has:
    a second tubular body;
    a resin member provided integrally with the second tubular body so as to be interposed between the second tubular body and the electric drive unit;
    a second fastening member inserted into the second tubular body for mounting the second tubular body to the attachment section; and
    a connection member that connects the second tubular body and the main body.

* * * * *